(12) United States Patent
Liao et al.

(10) Patent No.: US 10,644,840 B2
(45) Date of Patent: May 5, 2020

(54) METHODS OF EFFICIENT HARQ OPERATION FOR LOW LATENCY AND HIGH PERFORMANCE SERVICES

(71) Applicant: MEDIATEK INC., Hsinchu (TW)

(72) Inventors: Pei-Kai Liao, Hsinchu (TW);
Ming-Che Lu, Hsinchu (TW);
Yen-Shuo Chang, Hsinchu (TW);
Chien-Hwa Hwang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/105,109

(22) Filed: Aug. 20, 2018

(65) Prior Publication Data

US 2019/0058554 A1 Feb. 21, 2019

Related U.S. Application Data

(60) Provisional application No. 62/547,919, filed on Aug. 21, 2017, provisional application No. 62/558,374, filed on Sep. 14, 2017.

(51) Int. Cl.
*H04L 1/18* (2006.01)
*H04W 72/04* (2009.01)
*H04W 88/02* (2009.01)

(52) U.S. Cl.
CPC .......... *H04L 1/1812* (2013.01); *H04L 1/1822* (2013.01); *H04L 1/1825* (2013.01);
(Continued)

(58) Field of Classification Search
CPC ... H04L 1/1812; H04L 1/1845; H04L 1/1835; H04L 1/1848; H04L 1/1896;
(Continued)

(56) References Cited

U.S. PATENT DOCUMENTS

| 2011/0013506 A1 | 1/2011 | Ishii et al. ..................... 370/208 |
| 2013/0051289 A1 | 2/2013 | Hsieh et al. .................. 370/280 |

(Continued)

FOREIGN PATENT DOCUMENTS

CN 106712912 A 10/2012

OTHER PUBLICATIONS

International Search Report and Written Opinion of International Search Authority for PCT/CN2018/101443 dated Nov. 2, 2018 (9 pages).

(Continued)

*Primary Examiner* — Rina C Pancholi
(74) *Attorney, Agent, or Firm* — Imperium Patent Works; Zheng Jin (57) ABSTRACT

An efficient Hybrid Automatic Repeat Request (HARQ) operation for low-latency and high-performance services in one radio access technology (RAT) in a wireless communication network is proposed. Under the proposed single HARQ operation scheme, an adaptive HARQ-ACK feedback timing is applied based on UE conditions and UE capability to support the tradeoff between low-latency and high-performance applications. In one embodiment, UE signals the network its HARQ-ACK timing capability. Furthermore, an adaptive number of HARQ processes is applied with a fixed HARQ soft buffer size because the hardware cost for HARQ soft buffer does not linearly increase with the number of HARQ processes. In one embodiment, UE determines a nominal HARQ soft buffer size and HARQ soft buffer size for each HARQ process based on a network-configured HARQ process number.

10 Claims, 4 Drawing Sheets

(52) U.S. Cl.
CPC .......... *H04L 1/1835* (2013.01); *H04L 1/1845* (2013.01); *H04L 1/1848* (2013.01); *H04L 1/1854* (2013.01); *H04L 1/1864* (2013.01); *H04L 1/1896* (2013.01); *H04W 72/0446* (2013.01); *H04W 88/02* (2013.01)

(58) Field of Classification Search
CPC ... H04L 1/1864; H04L 1/1854; H04L 1/1825; H04L 1/1822; H04W 72/0446; H04W 88/02
See application file for complete search history.

(56) References Cited

U.S. PATENT DOCUMENTS

| | | | |
|---|---|---|---|
| 2014/0241220 A1 | 8/2014 | Choi et al. .................. | 370/280 |
| 2015/0009897 A1* | 1/2015 | Wilhelmsson ........ | H04L 1/0007 |
| | | | 370/328 |
| 2015/0222394 A1 | 8/2015 | Cheng et al. ............... | 370/280 |
| 2016/0323070 A1* | 11/2016 | Chen ..................... | H04L 1/1861 |

OTHER PUBLICATIONS

Taiwan IPO, office action for the TW patent application 108129604 (no English translation is available) dated Jan. 31, 2020 (7 pages).

\* cited by examiner

METHODS OF EFFICIENT HARQ OPERATION FOR LOW LATENCY AND HIGH PERFORMANCE SERVICES

CROSS REFERENCE TO RELATED APPLICATIONS

This application claims priority under 35 U.S.C. § 119 from U.S. Provisional Application No. 62/547,919 entitled "Method of Efficient HARQ Operation for Low-Latency & High-Performance Services," filed on Aug. 21, 2017; U.S. Provisional Application No. 62/558,374 entitled "Method of Efficient HARQ Operation for Low-Latency & High-Performance Services," filed on Sep. 14, 2017, the subject matter of which is incorporated herein by reference.

TECHNICAL FIELD

The disclosed embodiments relate to Hybrid Automatic Repeat Request (HARQ) operation, and more specifically, to adaptive HARQ feedback timing and adaptive HARQ process number with fixed HARQ soft buffer size in next generation 5G new radio (NR) mobile communication networks.

BACKGROUND

A Long-Term Evolution (LTE) system offers high peak data rates, low latency, improved system capacity, and low operating cost resulting from simple network architecture. An LTE system also provides seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred as user equipments (UEs). Enhancements to LTE systems are considered so that they can meet or exceed International Mobile Telecommunications Advanced (IMT-Advanced) fourth generation (4G) standard.

The signal bandwidth for next generation 5G new radio (NR) system is estimated to increase to up to hundreds of MHz for below 6 GHz bands and even to values of GHz in case of millimeter wave bands. Furthermore, the NR peak rate requirement can be up to 20 Gbps, which is more than ten times of LTE. It is therefore expected that 5G NR system needs to support dramatically larger transport block (TB) sizes as compared to LTE, which result in a much more code block (CB) segments per TB. Three main applications in 5G NR system include enhanced Mobile Broadband (eMBB), Ultra-Reliable Low Latency Communications (URLLC), and massive Machine-Type Communication (MTC) under milli-meter wave technology, small cell access, and unlicensed spectrum transmission. Multiplexing of eMBB & URLLC within a carrier is also supported.

A technique referred to as Hybrid Automatic Repeat ReQuest (HARQ) is employed for error detection and correction. HARQ is a combination of forward error correction (FEC) and Automatic Repeat ReQuest (ARQ). It uses error detection to detect uncorrectable errors. The packets in error are discarded and the receiver requests retransmission of corrupted packets. In a standard ARQ, error detection bits are added to data to be transmitted. In Hybrid ARQ, error correction bits are also added. When the receiver receives a data transmission, the receiver uses the error detection bits to determine if data has been lost. If it has, then the receiver may be able to use the error correction bits to recover the lost data. If the receiver is not able to recover the lost data using the error correction bits, then the receiver may use a second transmission of additional data (including more error correction information) to recover the data. Error correction can be performed by combining information from the initial transmission with additional information from one or more subsequent retransmissions.

HARQ consists of multiple HARQ processes with each operation on a single transport block (TB). The transmitter stops and waits for an acknowledgement (ACK) from the receiver, called HARQ-ACK, after each transmission of TB. The HARQ-ACK indicates whether the TB is correctly received or not. In 3GPP 5G NR, data services with low latency becomes a key differentiation from 4G LTE. From a latency perspective, the time between the reception of data and transmission of HARQ-ACK should be as short as possible. However, an unnecessarily short time would increase the demand on the processing capability. To achieve low latency, UE throughput may be sacrificed for a tradeoff due to UE hardware limitation and power consumption. A single HARQ operation scheme is sought to support the tradeoff between low-latency and high-performance.

SUMMARY

An efficient Hybrid Automatic Repeat Request (HARQ) operation for low-latency and high-performance services in one radio access technology (RAT) in a wireless communication network is proposed. Under the proposed single HARQ operation scheme, an adaptive HARQ-ACK feedback timing is applied based on UE conditions and UE capability to support the tradeoff between low-latency and high-performance applications. In one embodiment, UE signals the network its HARQ-ACK timing capability. Furthermore, an adaptive number of HARQ processes is applied with a fixed HARQ soft buffer size because the hardware cost for HARQ soft buffer does not linearly increase with the number of HARQ processes. In one embodiment, UE determines a nominal HARQ soft buffer size and HARQ soft buffer size for each HARQ process based on a network-configured HARQ process number.

In one embodiment, a UE transmits hybrid automatic repeat request (HARQ) capability information in a wireless communication network. The HARQ capability information comprises a supported HARQ-ACK timing capability associated with a list of parameters. The UE receives a higher-layer configuration from the network that configures a set of applicable HARQ-ACK timings. The UE receives a physical-layer signaling from the network that configures an applied HARQ-ACK timing for a downlink data packet. The UE transmits an HARQ ACK/NACK in response to the downlink data packet based on the applied HARQ-ACK timing.

In another embodiment, a UE receives a higher-layer signaling in a wireless communication network. The higher-layer signaling indicates a number of configured hybrid automatic repeat request (HARQ) processes. The UE determines a nominal HARQ soft buffer size for a channel coding chain rate matching based on a UE category. The UE determines an HARQ soft buffer size for each HARQ process by dividing the nominal HARQ soft buffer size with the number of configured HARQ processes. The UE performs HARQ operation based on the nominal HARQ soft buffer size and an actual HARQ soft buffer size of the UE.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
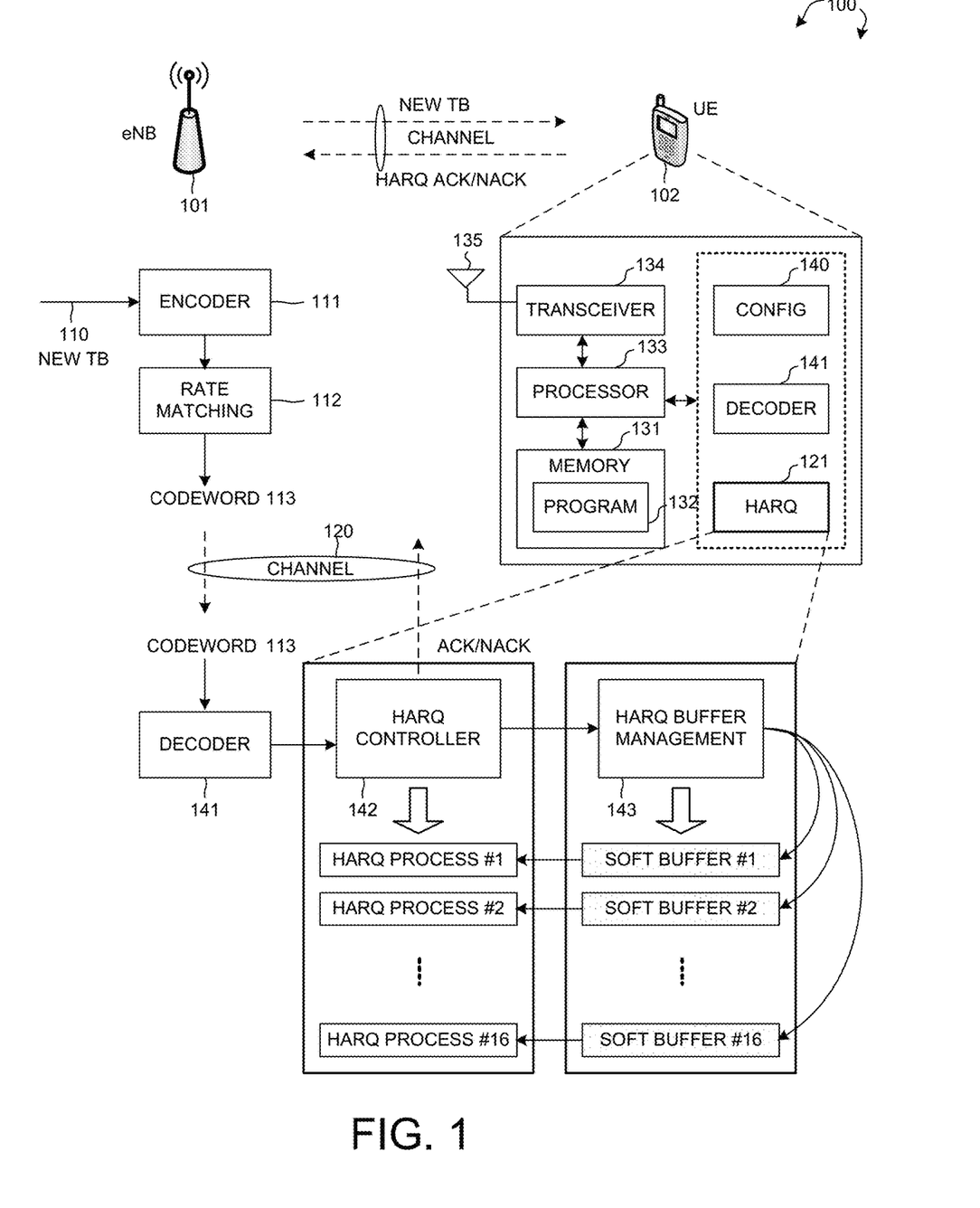
FIG. 1 illustrates a mobile communication network with adaptive HARQ feedback timing and adaptive HARQ process number for HARQ operation in accordance with one novel aspect.

FIG. 1 illustrates a next generation 5G new radio (NR) mobile communication network 100 with adaptive HARQ ACK timing and adaptive HARQ process number for Hybrid Automatic Repeat Request (HARQ) operation in accordance with one novel aspect. Mobile communication network 100 is a 5G NR system having a base station BS 101 and a user equipment UE 102. Three main applications in 5G NR include enhanced Mobile Broadband (eMBB), Ultra-Reliable Low Latency Communications (URLLC), and massive Machine-Type Communication (MTC) under millimeter wave technology, small cell access, and unlicensed spectrum transmission. Multiplexing of eMBB & URLLC within a carrier is supported. For downlink (DL) data transmission, at the transmitter side, BS 101 takes a new transport block (TB) as encoder input, performs encoding via encoder 111 and rate matching via rate-matching module 112, and generates a codeword 113 corresponding to TB 110 to be transmitted to UE 102 over wireless channel 120. The BS then performs rate matching based on physical resource allocation. It is expected that 5G NR needs to support dramatically larger TB sizes as compared to LTE, which result in much more code block (CB) segments per TB. In another word, TB 110 may contain up to one hundred CBs.

At the receiver side, UE 102 receives codeword 113 having multiple CBs, performs decoding via decoder 141, and sends out an ACK or NACK back to BS 101 based on the decoding result under HARQ operation. HARQ consists of multiple HARQ processes with each operating on a single TB. The transmitter BS 101 stops and waits for an HARQ-ACK or HARQ-NACK from the receiver UE 102 after each transmission of TB. If a new TB turns out to be an erroneous TB after decoding, then BS 101 retransmits the TB after receiving the NACK, and UE 102 performs HARQ operation via HARQ controller 142 and HARQ buffer management circuit 143. For each new erroneous TB, the HARQ controller 142 assigns an HARQ process, stores the erroneous TB in a corresponding soft buffer allocated from HARQ buffer management circuit 143, and waits for retransmission data from BS 101 to perform data recovery. For example, TB #1 is associated with HARQ process #1 having soft buffer #1, TB #2 is associated with HARQ process #2 having soft buffer #2 . . . and so on so forth.

In 3GPP 5G NR, data services with low latency becomes a key differentiation from 4G LTE. From a latency perspective, the time between the reception of data and transmission of HARQ-ACK should be as short as possible. However, an unnecessarily short time would increase the demand on the processing capability. To achieve low latency, UE throughput may be sacrificed for a tradeoff due to UE hardware limitation and power consumption. In accordance with one novel aspect, an efficient HARQ operation to support both low-latency and high-performance services in one radio access technology (RAT) is proposed. Under the proposed single HARQ operation scheme, an adaptive HARQ-ACK feedback timing is applied based on UE conditions and UE capability to support the tradeoff between low-latency and high-performance. Furthermore, an adaptive number of HARQ processes is applied with a fixed HARQ soft buffer size because the hardware cost for HARQ soft buffer does not linearly increase with the number of HARQ processes.

FIG. 1 further illustrates a simplified block diagram of UE 102 that carries embodiments of the present invention. UE 102 comprises memory 131, a processor 133, an RF transceiver 134, and an antenna 135. RF transceiver 134, coupled with antenna 135, receives RF signals from antenna 135, converts them to baseband signals and sends them to processor 133. RF transceiver 134 also converts received baseband signals from processor 133, converts them to RF signals, and sends out to antenna 135. Processor 133 processes the received baseband signals and invokes different functional modules and circuits to perform features in UE 102. Memory 131 stores program instructions and data 132 to control the operations of UE 102. The program instructions and data 132, when executed by processor 133, enables UE 102 to decode TBs and perform HARQ operation accordingly.

UE 102 also comprise various function modules and circuits that can be implemented and configured in a combination of hardware circuits and firmware/software codes being executable by processors 133 to perform the desired functions. Each functional module or circuit may comprise a processor together with corresponding program codes. In one example, UE 102 comprises a configuration module 140 for determining and configuring HARQ related capabilities and parameters, a decoder 141 that decodes new TBs, and an HARQ module 121 further comprising HARQ controller 142 and HARQ buffer 143 for supporting the HARQ scheme with adaptive HARQ-ACK timing and adaptive HARQ process number. Specifically, the UE signals the HARQ capability, e.g., UE-supported HARQ-ACK timing under different conditions to the network, and also determines a fixed HARQ soft buffer size with a network-configured HARQ process number.

Figure 2:
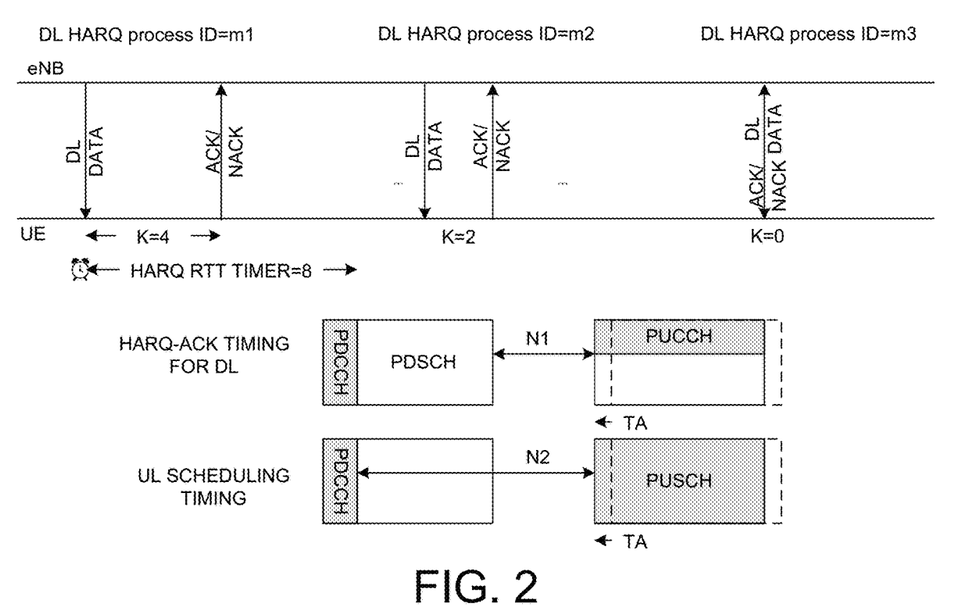
FIG. 2 illustrates one embodiment of HARQ operation with adaptive HARQ-ACK timing in accordance with one novel aspect.

FIG. 2 illustrates one embodiment of HARQ operation with adaptive HARQ-ACK timing in accordance with one novel aspect. Wireless communication is carried over a wireless channel in the form of radio frames, each radio frame consists of a number of subframes as defined in 4G specification. A subframe is also referred to as a slot in 5G specification. Each subframe or slot consists of a number of OFDM symbols. For a downlink DL data packet, it is transmitted over a physical downlink shared channel (PDSCH) to UE, and a corresponding HARQ-ACK is transmitted over a physical uplink control channel (PUCCH) to BS under a DL HARQ process.

There is one HARQ RTT timer per DL HARQ process. During Active Time, for a PDCCH-subframe, for example, if the subframe is not part of a configured measurement gap, and if the PDCCH indicates a DL transmission or if a DL assignment has been configured for this subframe, then UE will start the HARQ RTT Timer for the corresponding HARQ process. In FDD, HARQ RTT timer is eight subframes. In TDD, the duration of HARQ RTT Timer is set to k+4 subframes, where k is the interval between the downlink transmission and the transmission of associated HARQ ACK feedback. The first parameter is k, which means given a DL transmission in a subframe, after k subframe, UE should feedback ACK/NACK to eNB. The second parameter, (k+4), is the HARQ RTT timer. For example, if a UE receives a DL new transmission in subframe 0, then UE should feedback ACK/NACK in subframe 0+k, and the HARQ RTT timer should set as k+4=4+4=8. As a result, the HARQ RTT timer should count down 8 subframes.

To support different applications, e.g., low-latency application or high-performance application, multiple HARQ operation timings are supported in a wireless communication system. In the example of FIG. 2, three different HARQ-ACK timings are illustrated. In a first DL HARQ process m1, eNB transmits a DL packet at subframe n1, UR feedback HARQ ACK/NACK at subframe n1+4 (k=4). In a second DL HARQ process m2, eNB transmits a DL packet at subframe n2, UR feedback HARQ ACK/NACK at subframe n2+2 (k=2). In a third DL HARQ process m3, eNB transmits a DL packet at subframe n3, UR feedback HARQ ACK/NACK at the same subframe n3 (k=0). For applications that desire high-performance, HARQ-ARK timing with longer RTT may be applied to achieve higher throughput. For applications that desire low-latency, HAR-ACK timing with shorter RTT may be applied to achieve lower delay. The HARQ-ACK timing thus may be adaptively configured.

FIG. 2 also illustrates the HARQ-ACK timing for the downlink (N1 symbols) and the uplink scheduling timing for the uplink (N2 symbols). Specifically, HARQ-ACK timing is related to the time difference between the end of physical downlink shared channel (PDSCH) reception of a data packet and the start of physical uplink control channel (PUCCH) transmission of corresponding HARQ-ACK. In the example of FIG. 2, N1 symbols depicts the time difference and such time difference is related to UE processing time, so HARQ-ACK timing is dominated by the maximum data bits carried in PDSCH. UE processing time is defined as a number of OFDM symbols in 3GPP 5G specs while HARQ-ACK timing is determined with a number of subframes or slots. Therefore, HARQ-ACK timing should be able to accommodate UE processing time.

Figure 3:
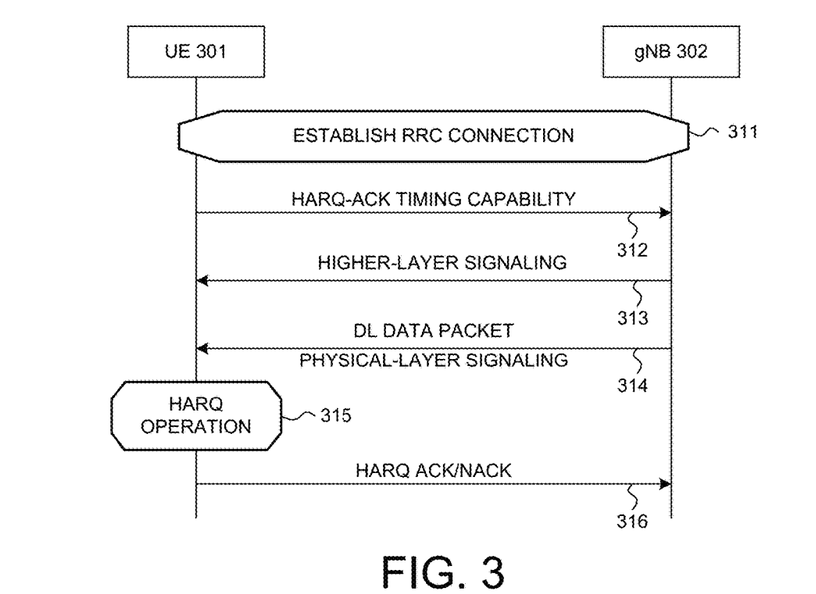
FIG. 3 illustrates a sequence flow of an HARQ operation with adaptive HARQ-ACK timing in accordance with one novel aspect.

FIG. 3 illustrates a sequence flow of an HARQ operation with adaptive HARQ-ACK timing in accordance with one novel aspect. In step 311, UE 301 establishes a radio resource control (RRC) connection with gNB 302. After initial access, in step 312, UE 301 signals to the eNB 302 its capability of one or multiple HARQ-ACK timing(s). If multiple HAR-ACK timings are supported by the UE, UE additionally signals at least one of the following parameters associated to each HAR-ACK timing. Option 1—the information related to maximum scheduled data rate for DL, e.g., DL peak data rate*subframe/slot time length=max data bits carried in PDSCH. Option 2—the information related to maximum number of scheduled information bits for DL within a subframe/slot, e.g., transport block size, X % maximum number information bits within a subframe/slot based on the corresponding UE category. Option 3—the information related to maximum number of scheduled coded bits for DL within a subframe/slot per carrier or all carriers. Option 4—the information related to maximum number of scheduled physical resource blocks (PRBs), e.g., equal to maximum number of scheduled PRBs per MIMO layer multiplied with maximum number of MIMO layers for DL within a subframe/slot per carrier or all carriers. Note that a larger PRB number can accommodate more data bits in PDSCH. In a preferred embodiment, the HARQ-ACK timing capability signaled in step 312 is indicated by a minimum processing time supported by UE 301.

In step 313, gNB 302 transmits a higher-layer signaling based on the UE capability. The network signals a subset of the supported HARQ-ACK timings to the UE, which contains one or multiple HARQ-ACK applicable timings. In step 314, gNB 302 transmits a DL data packet, and a physical-layer signaling regarding an actual applied HARQ-ACK timing for the DL data packet. Specifically, at the transmitter side, a new TB is encoded into a plurality of CBs by gNB 302 to be transmitted over a wireless channel. At the receiver side, in step 315, UE 301 performs TB or retransmitted data decoding and checks whether the decoding is successful. If all the CBs in a TB are correctly decoded, then HARQ TB ACK is feedback to the transmitter in step 316. On the other hand, if at least one CB in a TB is not correctly decoded, then HARQ TB NACK is feedback to the transmitter in step 316.

The UE-supported HARQ-ACK timing is associated with a list of specified conditions. First, it is related to subcarrier spacing (SCS) and corresponding subframe/slot duration of the subframe/slot for the DL data channel. Second, it is related to subframe, slot, or mini-slot size of the DL data channel in terms of the number of OFDM symbols. Usually HARQ-ACK timing is determined with a number of subframes/slots. HARQ-ACK timing is related to UE processing time, which can't be linearly scaled with the subcarrier spacing. So HARQ-ACK timing depends on subcarrier spacing and subframe/slot length (in terms of OFDM symbols). Third, it is related to the DMRS pattern applied for channel estimation, e.g., front-loaded DMRS only vs. front-loaded DMRS plus additional DMRS. The starting time UE can process the data bits carried in PDSCH also depends on when DMRS is received. This is because data decoding can't be started before channel estimation based on DMRS is done. Therefore, the earlier DMRS is received, the earlier UE processing PDSCH can be completed. Fourth, it is related to the time length of an UL PUCCH for HARQ-ACK, e.g., 1~2 OFDM symbols or more than 2 OFDM symbols. PUCCH is usually located at the end of a slot. If the time length of PUCCH for HARQ-ACK transmission is longer, it will shorten the UE processing time for the data bits carried in PDSCH. In one error case, UE is not expected to transmit corresponding HARQ-ACK in uplink for a scheduled DL data packet if the network set the HARQ-ACK timing without meeting the signaled UE capability and the list of specified corresponding conditions.

Figure 4:
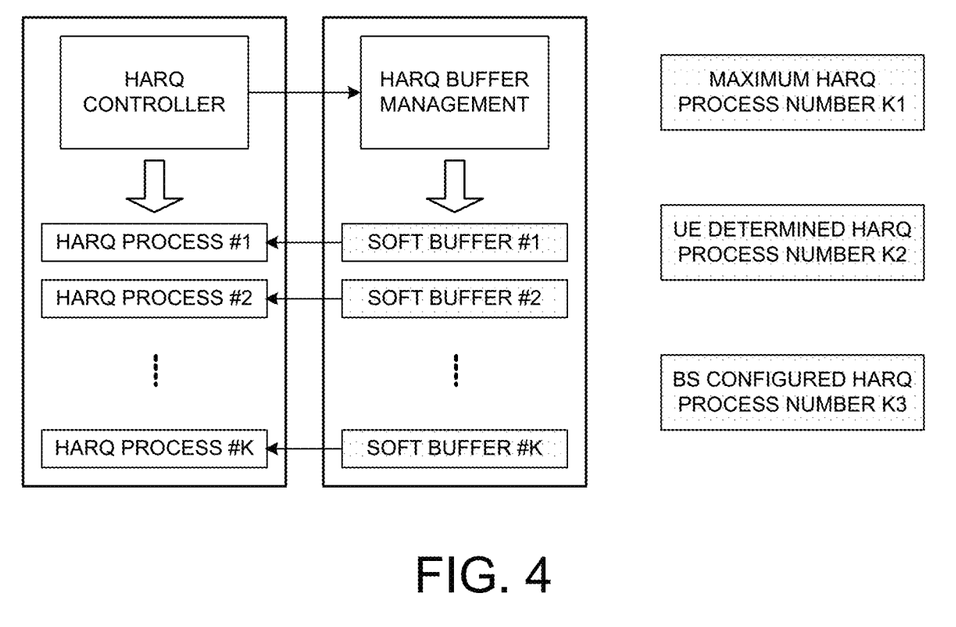
FIG. 4 illustrates one embodiment of HARQ operation with adaptive HARQ process number with fixed soft buffer size in accordance with one novel aspect.

FIG. 4 illustrates one embodiment of HARQ operation with adaptive HARQ process number with fixed soft buffer size in accordance with one novel aspect. The nominal HARQ soft buffer size for channel coding chain rate matching is specified based on a HARQ operation round-trip time (e.g. 2 ms or 4 ms) & a targeted data rate. For example, the nominal HARQ soft buffer size=peak data rate*the specified maximum HARQ round-trip time. The HARQ operation round-trip time is determined according to a targeted HARQ performance. The actual total HARQ soft buffer within a UE can be different from the nominal HARQ soft buffer size for channel coding chain. For a wireless communication system, maximal HARQ process number is K1 (e.g., K1=16), which is specified as a fixed value in the specification for all cases. For each subcarrier spacing, the HARQ process number K2 is determined based on the specified maximum HARQ operation round-trip time, wherein K2≤K1. K2 value changes depending on the subcarrier spacing, assuming a fixed HARQ operation round-trip time. For example, if SCS=15 k, then K2=2; if SCS=30 k, then K2=4; if SCS=60 k, then K2=8; if SCS=120 k, then K2=16. K2 can be used to determine the nominal soft buffer size=(max number of data bits*K2). In addition, the network will configure an actual applied HARQ process number K3 to UE via higher-layer signaling. For example, the network may determine K3 based on the latency or performance requirement of each application.

Figure 5:
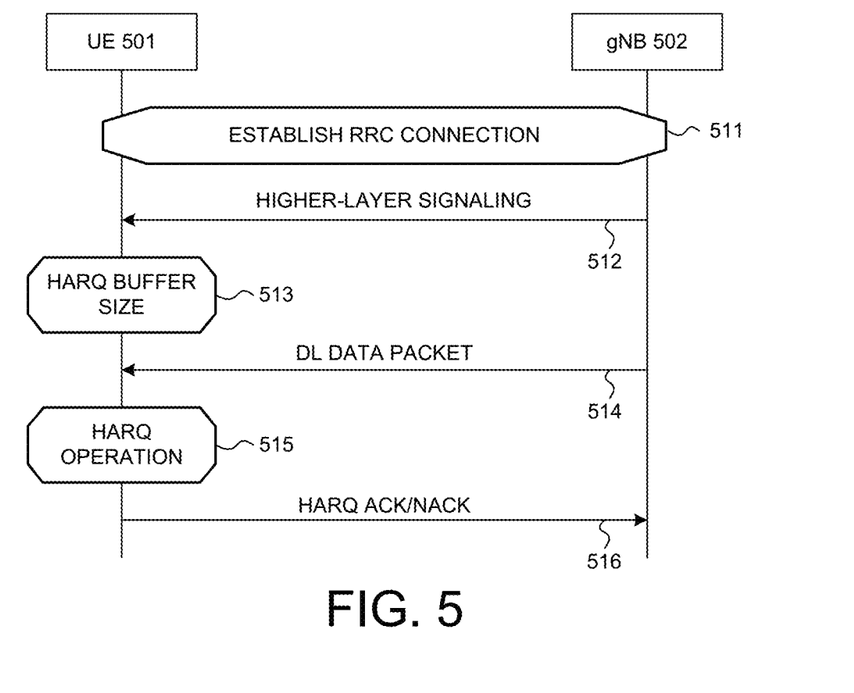
FIG. 5 illustrates a sequence flow of an HARQ operation with adaptive HARQ process number with fixed soft buffer size in accordance with one novel aspect.

FIG. 5 illustrates a sequence flow of an HARQ operation with adaptive HARQ process number with fixed soft buffer size in accordance with one novel aspect. In step 511, UE 501 establishes a radio resource control (RRC) connection with gNB 502. In step 512, gNB 502 signals the actual applied HARQ process number K3 to UE 501. The signaling can be physical-layer (layer 1), MAC-layer (layer 2) or RRC-layer (layer 3) signaling. In step 513, UE 501 determines the nominal HARQ soft buffer size for channel coding chain. UE 501 also determines the soft buffer size for each HARQ process, by dividing the determined nominal HARQ soft buffer size with the configured HARQ process number K3. In step 514, UE 501 receives a DL data packet from gNB 502. In step 515, UE 501 performs TB or retransmitted data decoding and checks whether the decoding is successful. If all the CBs in a TB are correctly decoded, then HARQ TB ACK is feedback to the transmitter in step 516. On the other hand, if at least one CB in a TB is not correctly decoded, then HARQ TB NACK is feedback to the transmitter in step 516. UE 501 Performs HARQ operation based on the determined nominal HARQ soft buffer size and actual HARQ soft buffer size within the UE. If K3≤K2, HARQ performance can be guaranteed to be equivalent or better than the targeted HARQ performance, assuming nominal HARQ soft buffer size. If K3>K2, HARQ performance degrades with increasing K3, because each HARQ process can only have a smaller soft buffer=nominal soft buffer/K3. However, if a UE has a larger soft buffer than the nominal HARQ soft buffer size and K3>K2, then the HARQ performance may not degrade with increasing K3 because the UE can utilize the actual larger soft buffer for the HARQ operation.

Figure 6:
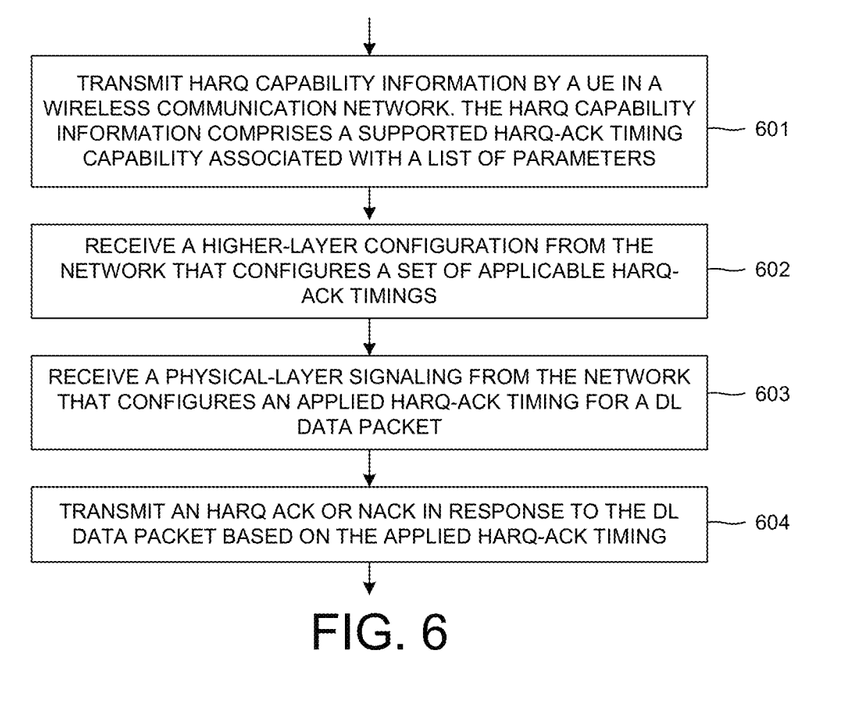
FIG. 6 is a flow chart of a method of applying adaptive HARQ-ACK timing for HARQ operation in accordance with one novel aspect.

FIG. 6 is a flow chart of a method of applying adaptive HARQ-ACK timing for HARQ operation in accordance with one novel aspect. In step 601, a UE transmits hybrid automatic repeat request (HARQ) capability information in a wireless communication network. The HARQ capability information comprises a supported HARQ-ACK timing capability associated with a list of parameters. In step 602, the UE receives a higher-layer configuration from the network that configures a set of applicable HARQ-ACK timings. In step 603, the UE receives a physical-layer signaling from the network that configures an applied HARQ-ACK timing for a downlink data packet. In step 604, the UE transmits an HARQ ACK/NACK in response to the downlink data packet based on the applied HARQ-ACK timing.

Figure 7:
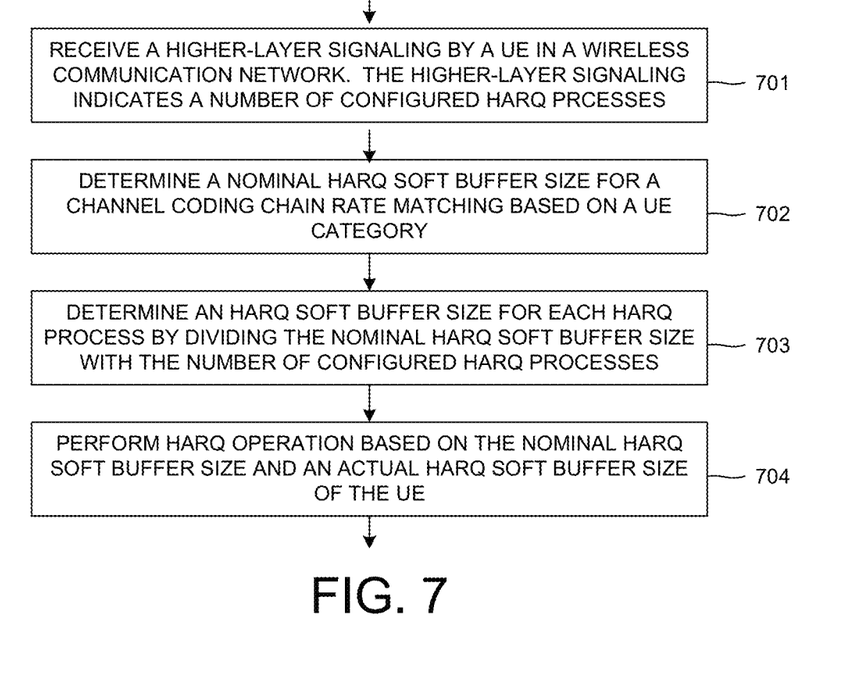
FIG. 7 is a flow chart of a method of applying adaptive HARQ process number with a fixed HARQ soft buffer size for HARQ operation in accordance with one novel aspect.

FIG. 7 is a flow chart of a method of applying adaptive HARQ process number with a fixed HARQ soft buffer size for HARQ operation in accordance with one novel aspect. In step 701, a UE receives a higher-layer signaling in a wireless communication network. The higher-layer signaling indicates a number of configured hybrid automatic repeat request (HARQ) processes. In step 702, the UE determines a nominal HARQ soft buffer size for a channel coding chain rate matching based on a UE category. In step 703, the UE determines an HARQ soft buffer size for each HARQ process by dividing the nominal HARQ soft buffer size with the number of configured HARQ processes. In step 704, the UE performs HARQ operation based on the nominal HARQ soft buffer size and an actual HARQ soft buffer size of the UE.

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
transmitting hybrid automatic repeat request (HARQ) capability information by a user equipment (UE) in a wireless communication network, wherein the HARQ capability information comprises a supported HARQ-ACK timing capability associated with a list of parameters;
receiving a higher-layer configuration from the wireless communication network that configures a set of applicable HARQ-ACK timings;
receiving a physical-layer signaling from the wireless communication network that configures an applied HARQ-ACK timing for a downlink data packet; and
transmitting an HARQ ACK or NACK in response to the downlink data packet based on the applied HARQ-ACK timing, wherein the supported HARQ-ACK timing capability is associated with a list of specified conditions comprising a subcarrier spacing, and a demodulation reference signal (DMRS) pattern for channel estimation.

2. The method of claim 1, wherein the supported HARQ-ACK timing capability is indicated by a minimum processing time supported by the UE.

3. The method of claim 1, wherein the list of parameters comprises at least one of: a maximum number of scheduled physical resource blocks (PRBs) within a slot, a maximum number of scheduled coded bits within a slot, a maximum number of scheduled information bits within a slot, and a maximum scheduled data rate.

4. The method of claim 1, wherein the UE does not transmit the HARQ ACK if the applied HARQ-ACK timing does not meet the supported HARQ-ACK timing capability and at least one of the specified conditions.

5. The method of claim 1, wherein the UE transmits the supported HARQ-ACK timing capability together with the list of specified conditions.

6. A User Equipment (UE) comprising:
a transmitter that transmits hybrid automatic repeat request (HARQ) capability information in a wireless communication network, wherein the HARQ capability information comprises a supported HARQ-ACK timing capability associated with a list of parameters;

a receiver that receives a higher-layer configuration from the wireless communication network that configures a set of applicable HARQ-ACK timings, wherein the receiver also receives a physical-layer signaling from the wireless communication network that configures an applied HARQ-ACK timing for a downlink data packet; and an HARQ controller that transmits an HARQ ACK or NACK in response to the downlink data packet based on the applied HARQ-ACK timing, wherein the supported HARQ-ACK timing capability is associated with a list of specified conditions comprising a subcarrier spacing, and a demodulation reference signal (DMRS) pattern for channel estimation.

7. The UE of claim 6, wherein the supported HARQ-ACK timing capability is indicated by a minimum processing time supported by the UE.

8. The UE of claim 6, wherein the list of parameters comprises at least one of: a maximum number of scheduled physical resource blocks (PRBs) within a slot, a maximum number of scheduled coded bits within a slot, a maximum number of scheduled information bits within a slot, and a maximum scheduled data rate.

9. The UE of claim 6, wherein the UE does not transmit the HARQ ACK if the applied HARQ-ACK timing does not meet the supported HARQ-ACK timing capability and at least one of the specified conditions.

10. The UE of claim 6, wherein the UE transmits the supported HARQ-ACK timing capability together with the list of specified conditions.

* * * * *